Dec. 5, 1961  I. A. ENGLANDER  3,011,607
FLUID COUPLING FOR ACCESSORY DRIVE
Filed Feb. 17, 1958  2 Sheets-Sheet 1
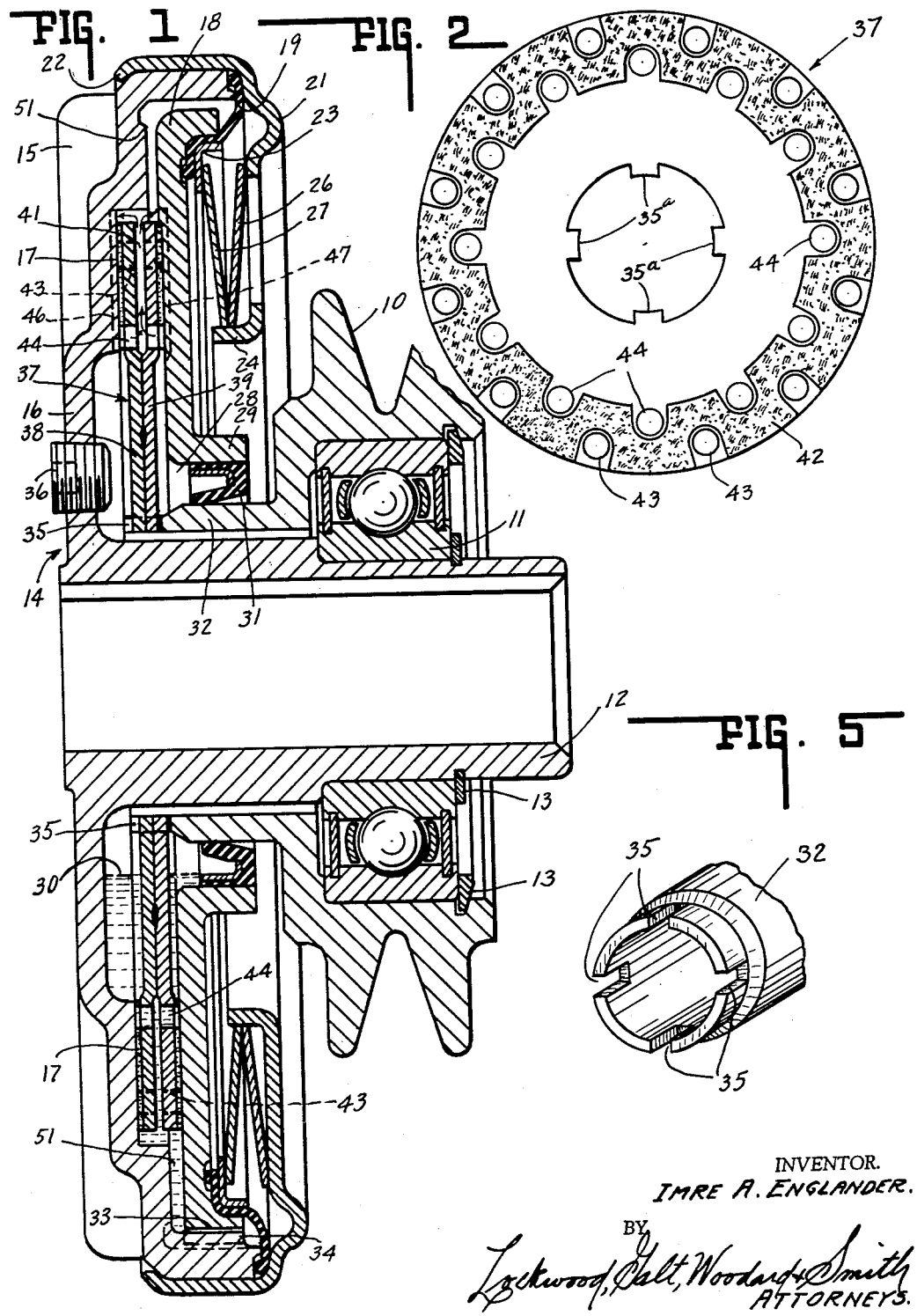
INVENTOR.
IMRE A. ENGLANDER.
BY
Lockwood, Galt, Woodard & Smith.
ATTORNEYS.

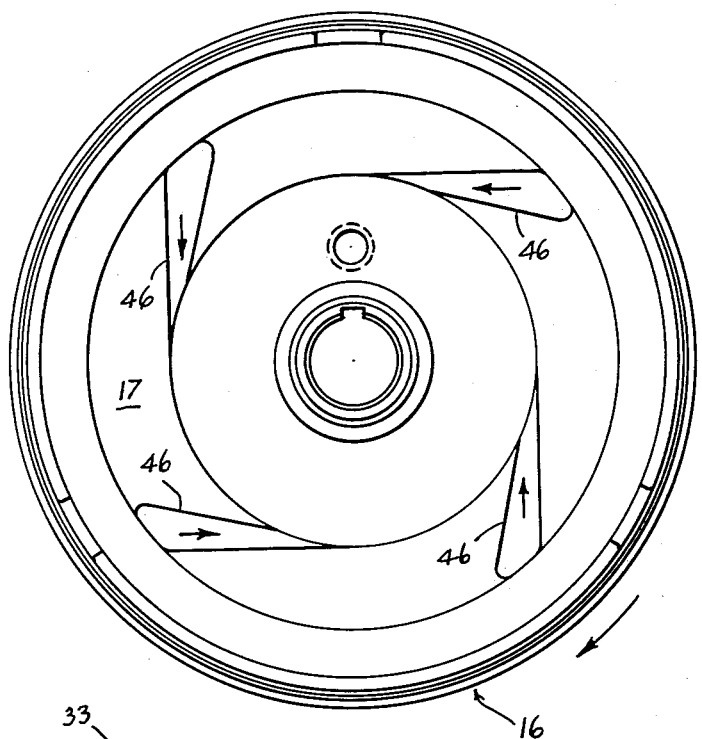
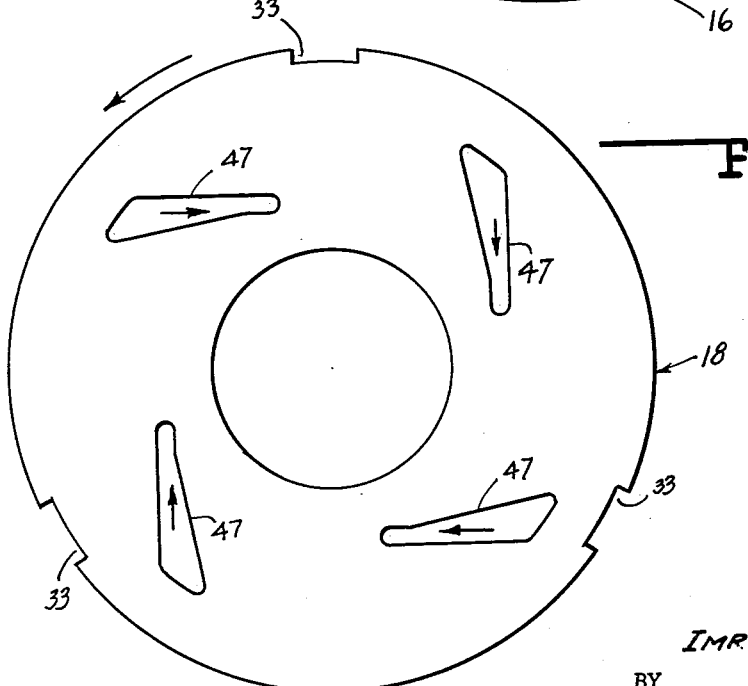

United States Patent Office 3,011,607
Patented Dec. 5, 1961

3,011,607
FLUID COUPLING FOR ACCESSORY DRIVE
Imre A. Englander, Indianapolis, Ind., assignor to Schwitzer Corporation, Indianapolis, Ind., a corporation
Filed Feb. 17, 1958, Ser. No. 715,654
5 Claims. (Cl. 192—58)

This invention relates generally to a fluid coupling for driving accessory devices such as are commonly associated with an internal combustion engine or similar driving means. Such accessory, for example, may include an electric generator, air conditioner, compressor, power steering hydraulic pump, and other accessories.

Generally speaking, in order to obtain the necessary output when the power source is operating at low speeds, it is necessary to operate these accessories at high speed ratios. When the power source is operating at maximum speeds the accessory is then run at speeds far in excess of that which would be required to satisfy the required output of the accessory. For example, a typical automotive generator will reach maximum output at a speed of approximately 2600 r.p.m. An average power steering pump can supply enough pressure and oil flow at about 1200 r.p.m. Speeds in excess of these consume more power, complicate the construction of the accessory and make them more costly. It is, therefore, advantageous to provide a coupling that would control the maximum output speed of the accessory.

In the co-pending application of Thomas J. Weir, assigned to the assignee of the present invention, identified as follows: "Fluid Coupling Mechanism," Serial No. 582,187, filed May 2, 1956, now Patent 2,879,755; Fluid Coupling Mechanism," Serial No. 662,802, filed May 31, 1957; and "Fluid Coupling Device," Serial No. 684,139, filed September 16, 1957, there are disclosed and claimed various forms of fluid coupling mechanisms adapted to reduce the power requirements of engine accessories and characterized by fluid passages formed in certain of the rotating parts to facilitate circulation of the friction fluid for dissipation of heat generated in the fluid.

The principal object of the present invention is to provide a fluid coupling device of the type referred to above in which a rotary drive assembly, or rotor, rotates within a driven housing having a movable wall or piston, the wall moving away from the drive assembly to lower the transmission of torque between the driving rotor and driven housing in response to the increased speed of the assembly.

A further object of the present invention is to provide a fluid coupling device of the type referred to above having a plurality of series of radially spaced, peripheral passages in the drive assembly which maintain the heat dissipating circulation of fluid therethrough as the fluid level within the housing changes upon displacement of its movable wall.

A further object of the present invention is to provide a fluid coupling device in which the centrifugal force exerted on the fluid serves to provide a pressure which displaces the driven member away from the driving member thereby reducing the transmission of torque therebetween as the speed of the driven member increases.

The full nature of the invention will be understood from the accompanying drawings and the following description and claims:

FIG. 1 is a section taken axially through a fluid coupling that may be adapted for driving an electric generator.

FIG. 2 is a front elevation of the drive disc assembly or rotor.

FIG. 3 is a front elevation of a portion of the housing shown in FIG. 1.

FIG. 4 is a front elevation of the movable wall of the housing shown in FIG. 1.

FIG. 5 is a fragmentary, perspective view of a portion of the apparatus shown in FIG. 1.

In the drawing there is illustrated as one example of the invention a fluid coupling for driving an electrical generator which is a conventional accessory for an auto or truck engine. It will be understood that while so illustrated, the coupling may be similarly utilized for transmitting torque from a source of power to other driven accessories. The structure herein illustrated has to do particularly with the provision of a movable wall in the coupling housing, and the provision of radially spaced rows of passages in the rotor which maintain heat dissipating circulation of the coupling fluid even though the dynamic fluid level within the housing changes as the movable wall of the housing is displaced.

Referring to FIG. 1, the driving or torque producing element includes a pulley 10 which is appropriately notched to receive a V-belt having motion transmitting engagement with a pulley mounted upon the crankshaft of an internal combustion engine or other source of power (not shown). The pulley is supported upon an anti-friction bearing 11 carried by a sleeve 12, snap rings 13 serving to lock the bearing on the sleeve. The sleeve 12 forms a part of a housing assembly, indicated generally at 14, and the central aperture through the sleeve may be keyed or otherwise rotatably locked to the shaft of an electrical generator or other engine accessory, as previously mentioned.

The housing assembly includes a cup-shaped member 16 which may be formed integrally with the sleeve 12. The member 16 is formed on its outer face to provide radially extending cooling fins 15 and its inner surface provides a face area 17 inwardly offset from its marginal area. A movable wall or piston 18 closes the open end of the cup-shaped member and is sealed thereto by means of a diaphragm 19. The diaphragm is held in sealing engagement with the rim of the cup-shaped member by means of a cover or retaining plate 21 which may be crimped or spun, as indicated at 22, over an appropriate shoulder formed in the side of the cup-shaped member. A retainer ring 23 serves to hold the diaphragm in sealing relation with the outer face of the movable wall 18. The plate 21 is flanged inwardly at 24 thereby forming a seating recess for stacked Bellville springs 26 and 27. The spring assembly thus formed is bottomed against the retaining plate and exerts a force on the movable wall which biases it inwardly toward the end face of the cup-shaped member 16.

A central opening 28 in the movable wall is bordered by a flange 29 which accommodates a conventional fluid seal 31 having sliding engagement with an extending spindle portion 32 of the pulley. As may best be seen in FIG. 4, the movable wall 18 is provided with circumferentially spaced slots 33 which accommodate appropriately spaced bosses 34 extending from the sides of the inner surface of the cup-shaped member, these bosses accommodated within the slots serving to guide the movement of the wall 18 relative to the cup-shaped member.

From the foregoing it will be evident that the cup-shaped member 16 and the movable wall 18 provide a sealed fluid chamber which extends annularly from the sleeve 12 to the side surface of the cup-shaped member 16. A fill plug 36 threaded into an opening in the cup-shaped member permits filling of the fluid chamber with a suitable torque transmission fluid which may be, for example, of the silicone oil type. With the assembly at rest, the fluid chamber may be filled so that the fluid level therein may be approximately that shown at 30 in FIG. 1.

The extending spindle 32 forming a part of the pulley member 10 carries a drive disc assembly or rotor indicated generally at 37. The rotor is rotatably locked on the spindle 32 by means of splines 35a (FIG. 2) on the rotor which are accommodated by notches 35 (FIG. 5) in the spindle, this arrangement permitting axial movement of the rotor relative to the spindle. The rotor assembly is formed of two face-to-face assembled rotor plates 38 and 39, the plates having their inner portions secured together in abutting relation by welding or other suitable means. The outer peripheral portions of the plates are slightly spaced apart to provide an annular fluid passage 41 therebetween. The outer surfaces of each of the plates are preferably provided with a facing 42 (FIG. 2) of asbestos, cork, or other suitable friction material. The plates are also provided with an outer spaced series of apertures 43 and an inner spaced series of apertures 44. The series of apertures 44 are spaced radially inward from the series of apertures 43, and, as may be seen in FIG. 2, the facing 42 is appropriately formed so as not to obstruct either series of apertures.

Referring now to FIG. 3, it may be seen that the central annular area 17 of the end face of the cup-shaped member 16 is provided with tangential grooves or passages 46 having a generally inwardly tapering configuration. The grooves 46 abut the facing material 42 on the rotor plate 38 and provide for circulation of the torque transmitting fluid as will subsequently be described.

As may be seen in FIG. 4, the end face of the movable wall 18 is also provided with tangential grooves 47 which have a generally inwardly tapering configuration. The grooves 47 abut the facing material 42 carried by the rotor plate 39 and provide for circulation of the torque transmitting fluid, as will subsequently be described.

From the foregoing it will be evident that the rotor formed by the plates 38 and 39 extends rotatably within the fluid chamber formed by the cup-shaped member 16 and the movable wall 18, with the outer margin of the rotor being spaced from the peripheral sides of the cup-shaped member to thereby provide a pressure chamber 51.

In operation, upon rotation of the pulley 10 by the engine crankshaft, the torque transmitting fluid will be distributed by centrifugal force within the fluid chamber. Torque will thereupon be transmitted from the pulley spindle 32 and the rotor to the housing, and consequently to the shaft of the generator to which it is rotatably locked. The torque transmission between the rotor and the housing occurs through the resistance to shearing stress afforded by the fluid disposed between the rotor and the adjacent surfaces of the cup-shaped member 16 and the movable wall 18.

The initial speed of the rotor causes the fluid level within the fluid chamber to recede to a point adjacent the inner series of apertures 44 in the rotor. Under conditions where there is a differential between the input and output of the coupling, the rotor is rotated at a speed greater than that of the housing, and the fluid will be forced outwardly through the central passage 41 between the plates, as indicated by arrows in FIG. 1. Assuming that the pulley 10 is rotating counter-clockwise as viewed from the right in FIG. 1, since the rotation of the rotor leads the rotation of the housing, the relative rotation of the cup-shaped member will be clockwise as indicated by the arrow in FIG. 3. Under these conditions the grooves 46 will entrain fluid passing outwardly from the passage 41 and direct it inwardly as indicated by arrows in FIG. 3. Similarly, since the relative rotation of the movable wall 18 is counter-clockwise viewed from the left of FIG. 1 and as shown in FIG. 4, the grooves 47 in the face of the movable wall will likewise direct fluid inwardly toward the apertures 43 and 44 as indicated by arrows in FIG. 4.

It will be apparent that a multiple, toroidal circulation of fluid is established by means of apertures 43 and 44 and passages 46 and 47 which tends to dissipate heat generated therein and prevents the formation of localized areas of high temperature on the torque transmitting surfaces.

Should the speed of the housing materially increase due to decreased load or increased pulley speed, the centrifugal force exerted on the fluid in the pressure chamber 51 will provide a force acting on the marginal area of the movable wall sufficient to displace the wall outwardly within the cup-shaped member 16. The biasing spring assembly formed by the Bellville springs 26 and 27 resists the outward movement of the wall 18. This outward movement of the wall 18 increases the spacing between the wall and the adjacent rotor surface. Since the torque transmitted between the rotor and the opposed faces of the cup-shaped member and the movable wall is a direct function of the spacing between these members, it will be evident that as the movable wall is displaced away from the rotor, the transmission of torque to the housing will decrease. Thus, as the speed of the housing increases, the movable wall will be displaced from the rotor to permit increased slippage of the housing relative to the rotor, the housing thereby driving the generator shaft accommodated within the sleeve 12 at a speed which is considerably reduced with relation to the speed of the pulley.

Should the speed of the housing start to decrease due to an increased load, the fluid pressure on movable wall 18 will be reduced. Consequently the opposing spring pressure will move the wall 18 closer to the rotor increasing the coupling torque capacity, thus tending to maintain the speed of the housing 14 and consequently adjust itself to the load.

As the movable wall is displaced away from the rotor, it will be evident that the volume of the fluid chamber will increase causing the dynamic level of the fluid in the chamber to further recede beyond the apertures 44 in the rotor. Under these conditions, the outer series of apertures 43 in the rotor maintain a foreshortened toroidal circulation of fluid as previously described.

It will be evident that the grooves 46 and 47 providing inward circulation of the fluid along its toroidal path might be formed in the facing material 42 provided on the rotor. When the grooves are so formed, and directed oppositely to their direction shown in FIGS. 3 and 4, the toroidal circulation of fluid will be maintained in the directions indicated in FIG. 1.

It will be further understood that the sealing diaphragm 19, above described, is only illustrative of sealing means between the movable wall and the member 16. Alternate forms of sealing means might also be provided, such alternate sealing means, for example, taking the form of an O-ring disposed between the adjacent sides of the wall 18 and the member 16.

The inwardly tapering or convergent configuration of the grooves 46 and 47 serves to create an axial pressure on the rotor which tends to prevent the rotor from sticking to the adjacent surfaces of the member 16 and the wall 18 under certain conditions of operation of the coupling device.

The invention claimed is:

1. In a fluid coupling, the combination comprising a fluid retaining housing having walls whose inner surfaces provide spaced faces defining opposite sides of a chamber, a supply of fluid in said chamber, said walls being relatively movable to vary the spacing between said faces, a rotor disposed in said chamber for rotation relative to said housing with its side surfaces extending in face-to-face relation with said wall faces, means for imparting relative rotation to said rotor and said housing whereby torque will be transmitted between said rotor and said housing through the shearing action of the fluid, the centrifugal force exerted on said fluid providing a pressure which increases the spacing between said wall faces to decrease the transmission of torque between the housing and the rotor as the speed of rotation thereof increases, and means for maintaining a toroidal circulation of fluid within said chamber with changes in the dynamic fluid level therein, said means including tangentially directed fluid passages at the side surfaces of said rotor and a plurality of radially spaced series of apertures in said rotor communicating with said fluid passages.

2. In a fluid coupling, the combination comprising a fluid retaining housing having fluid retaining walls whose inner surfaces provide spaced faces defining opposite sides of a chamber, a supply of fluid in said chamber, a rotor disposed in said chamber for rotation relative to said housing with its side surfaces extending in face-to-face relation with said wall faces, one of said walls being movable relative to the other to vary the spacing between said one wall and the adjacent rotor side surface, means for imparting relative rotation to said rotor and said housing whereby torque will be transmitted between said rotor and said housing through the shearing action of the fluid, the centrifugal force exerted on said fluid providing a pressure which increases the spacing between said one wall face and the adjacent rotor side surface to decrease the transmission of torque between the housing and the rotor as the speed of rotation thereof increases, and means for maintaining a toroidal circulation of fluid within said chamber with changes in the dynamic fluid level therein, said means including tangentially directed fluid passages at the side surfaces of said rotor and a plurality of radially spaced series of apertures in said rotor communicating with said fluid passages.

3. In a fluid coupling, the combination comprising a fluid retaining housing, said housing including a cup-shaped member and a movable wall within the member, the inner surfaces of said movable wall and said member defining a chamber adapted to contain fluid, a supply of fluid in said chamber, a rotor disposed in said chamber for rotation relative to said housing with its side surfaces extending in face-to-face relation with the adjacent surfaces of said movable wall and said member, the peripheral edge of said rotor being spaced from the peripheral margin of said chamber, means for imparting relative rotation to said rotor and said housing whereby torque will be transmitted between said rotor and said housing through the shearing action of the fluid, the centrifugal force exerted on the fluid disposed in said chamber beyond the peripheral edge of said rotor providing a pressure which displaces said wall away from said rotor thereby decreasing the transmission of torque between the housing and the rotor as the speed of rotation thereof increases.

4. In a fluid coupling, the combination comprising a fluid retaining housing, said housing including a cup-shaped member and a movable wall sealed to and disposed within the member substantially closing its open end, the inner surfaces of said wall and said member defining a chamber adapted to contain fluid, a supply of fluid in said chamber, a rotor disposed in said chamber for rotation relative to said housing with its side surfaces extending in face-to-face relation with the adjacent surfaces of said wall and said member, the peripheral edge of said rotor being spaced from the peripheral margin of said chamber, means for imparting relative rotation to said rotor and said housing whereby torque will be transmitted between said rotor and said housing through the shearing action of the fluid, the centrifugal force exerted on the fluid disposed in said chamber beyond the peripheral edge of said rotor providing a pressure which displaces said wall away from said rotor thereby decreasing the transmission of torque between the housing and the rotor as the speed of rotation thereof increases, and means for maintaining a toroidal circulation of fluid within said chamber with changes in the dynamic fluid level therein, said means including tangentially directed fluid passages at the side surfaces of said rotor and a plurality of radially spaced series of apertures in said rotor communicating with said fluid passages.

5. In a fluid coupling, the combination comprising a fluid retaining housing, said housing including a cup-shaped member and a movable wall within the member, the inner surfaces of said wall and said member defining a chamber adapted to contain fluid, a supply of fluid in said chamber, a rotor disposed in said chamber for rotation relative to said housing with its side surfaces extending in face-to-face relation with the adjacent surfaces of said wall and said member, the peripheral edge of said rotor being spaced from the peripheral margin of said chamber, means for imparting relative rotation to said rotor and said housing whereby torque will be transmitted between said rotor and said housing through the shearing action of the fluid, the centrifugal force exerted on the fluid disposed in said chamber beyond the peripheral edge of said rotor providing a pressure which displaces said wall away from said rotor thereby decreasing the transmission of torque between the housing and the rotor as the speed of rotation thereof increases, and biasing means carried by said housing exerting a force on said wall opposing said pressure.

References Cited in the file of this patent

UNITED STATES PATENTS

| | | |
|---|---|---|
| 1,862,802 | Pope | June 14, 1932 |
| 2,079,724 | Van Ranst | May 11, 1937 |
| 2,432,591 | Schuckers | Dec. 16, 1947 |
| 2,517,955 | Zimmermann | Aug. 8, 1950 |
| 2,575,765 | Nabstedt et al. | Nov. 20, 1951 |
| 2,706,547 | Ranzi | Apr. 19, 1955 |
| 2,714,946 | Tenot et al. | Aug. 9, 1955 |
| 2,738,048 | Douglas | Mar. 13, 1956 |
| 2,879,755 | Weir | Mar. 31, 1959 |

FOREIGN PATENTS

| | | |
|---|---|---|
| 379,460 | Germany | Aug. 23, 1923 |